United States Patent [19] [11] 3,731,745
Koch [45] May 8, 1973

[54] COMBINED DRAFT HOOK OPERATING AND DRAFT SENSING

[75] Inventor: James Allen Koch, Hudson, Iowa
[73] Assignee: Deere & Company, Moline, Ill.
[22] Filed: Feb. 1, 1972
[21] Appl. No.: 222,557

[52] U.S. Cl. .................. 172/7, 172/9, 280/461 A
[51] Int. Cl. .............................. A01b 63/112
[58] Field of Search ................. 172/7, 9, 439; 280/461 A, 460 A

[56] References Cited

UNITED STATES PATENTS 2,974,733  3/1961  Fletcher ............................ 172/7
3,628,610  12/1971  Morkoski ........................ 172/7 X Primary Examiner—Robert E. Pulfrey
Assistant Examiner—Stephen C. Pellegrino
Attorney—H. Vincent Harsha et al.

[57] ABSTRACT

The lower draft links of a tractor three-point hitch include pivotal draft hooks which are power swung, by a pair of one-way hydraulic actuators, between open and closed positions for respectively receiving and retaining a hitch part of an implement. In the case of an earth-working implement, draft loads imposed on the hooks by the implement may vary during operation and cause variations in the pressure of the fluid in the actuators. A pressure responsive direction control valve is connected to the actuators and is shiftable in response to pressures above and below a preselected pressure for respectively directing fluid pressure to and exhausting fluid from a hydraulic lift cylinder for raising and lowering the draft links for adjusting the implement so as to maintain the preselected pressure in the actuators.

19 Claims, 4 Drawing Figures

Patented May 8, 1973

COMBINED DRAFT HOOK OPERATING AND DRAFT SENSING

BACKGROUND OF THE INVENTION

The present invention relates to a tractor hitch system and more particularly relates to a hitch system of the type which is draft responsive to adjust the working depth of an implement connected thereto to maintain a preselected draft force and to which an implement may be quickly and positively connected.

Prior art hitch systems of the above type are widely known; however, they lack overall simplicity, compactness and easiness of operation. Specifically, in the most common of the prior art hitches, draft is sensed by some sort of spring connected to the draft links and the deflection of the spring acts through a linkage which operates a draft link lift actuator control valve. A separate hand-operated linkage is provided for actuating a latch for releasably connecting the implement to the draft links.

SUMMARY OF THE INVENTION

Accordingly, it is a primary object of the present invention to provide an improved hitch system which is simple and compact and which includes power-operated connecting means for releasably connecting an implement to the hitch draft links.

Another object is to provide a hitch system having common means for releasably connecting an implement to the draft links and for sensing draft.

A more specific object is to provide releasable connecting means including a pair of pivotal draft hooks respectively swingable between open and closed implement part-receiving and retaining positions by a pair of hydraulic actuators.

Still another object is to provide draft hooks, as aforementioned, which serve to transfer draft forces to the working fluid in the pair of hydraulic actuators and to provide a pressure responsive valve shiftable in response to variations in the actuator pressures from a preselected pressure to actuate a hydraulic lift cylinder and cause vertical adjustment of the lift links to control the draft force and consequently maintain the preselected pressure in said actuators.

Yet another object is to provide one hydraulic system for transferring only the larger of the draft forces applied to the pair of hydraulic actuators to the pressure responsive valve, and to provide a modified system for transferring the sum of the draft forces applied to the pair of hydraulic actuators to the pressure responsive valve.

These and other objects will become apparent from the ensuing description and the appended drawings.

DESCRIPTION OF THE PREFERRED EMBODIMENT

Figure 1:
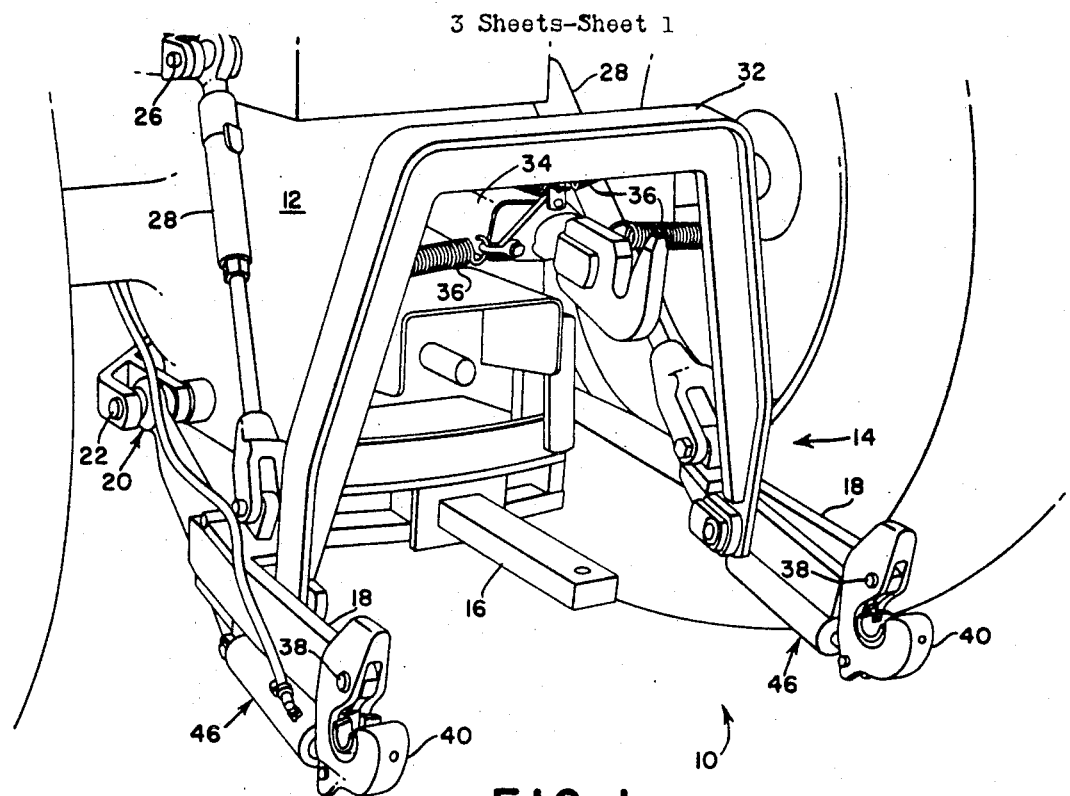
FIG. 1 is a perspective view of the rear portion of a tractor embodying a hitch system constructed according to the present invention.

Referring now to FIG. 1, there is shown the rear portion of a tractor 10 including a chassis 12. Attached to the chassis 12 and extending rearwardly therefrom is a hitch system comprising a three-point hitch 14 and a drawbar 16.

The three-point hitch 14 includes a pair of rearwardly extending draft links 18 attached for vertical movement by means of a pair of pivotal connections 20 (only one shown) including horizontal pins 22 located on a common horizontal axis. A horizontal transverse rockshaft 24 is journaled for rotation in the chassis 12 and a pair of crank arms 26 (only one shown) are secured to and extend rearwardly from the opposite ends of the rockshaft. Interconnected between the crank arms 26 and the draft links 18 at points medially of their opposite ends are a pair of lift links 28. An extensible and retractable hydraulic lift cylinder 30 is located in the chassis 12 and is connected to the rockshaft 24 for rocking the latter to cause the draft links 18 to be moved between lowered working positions and a raised transport position. The draft links 18 are held a fixed distance apart by an inverted U-shaped arch member 32 having the ends of its opposite legs pivotally connected to the draft links 18. An upper center link 34 is formed by a hydraulic actuator having one end pivotally connected to the chassis 12 and having its other end located beneath and suspended from the arch member 32 by a plurality of tension springs 36.

Respectively pivotally connected to the rear ends of the draft links 18, as at horizontal pins 38, are a pair of draft hooks 40 having upwardly opening receptacle portions 42 adapted for receiving a pin connecting member (not shown) usually forming part of an implement to be attached to the hitch. A pair of fixed receptacle portions or latch surfaces 44 are respectively formed at the rearward ends of the draft links 18 and are positioned to overlie and cooperate with receptacle portions 42 to define receptacles for retaining an implement part therein when the hooks are in their working position as illustrated in solid lines in FIG. 2. The hooks 40 and hence the receptacle portions 42 are rearwardly swingable from their working position to an implement part-receiving position, illustrated by dashed lines in FIG. 2, wherein free passage to and from the receptacle portions 42 is made possible.

The draft hooks 40 are pivoted between their implement part receiving and retaining positions by a pair of hydraulic actuators 46. The actuators 46 each include a cylinder 48 pivotally connected to a respective one of the links 18 and a rod 50 pivotally connected to a respective one of the hooks 40. Each of the rods 50 is integral with a relatively long piston 52 shiftably mounted in the associated cylinder. Compressed between the head end of each of the pistons 52 and the associated cylinder head end are a pair of concentric coil springs 54 and 56 which urge each of the pistons and rods rearwardly toward an extended position whereat the hooks 40 are held in their implement part receiving positions.

Figure 2:
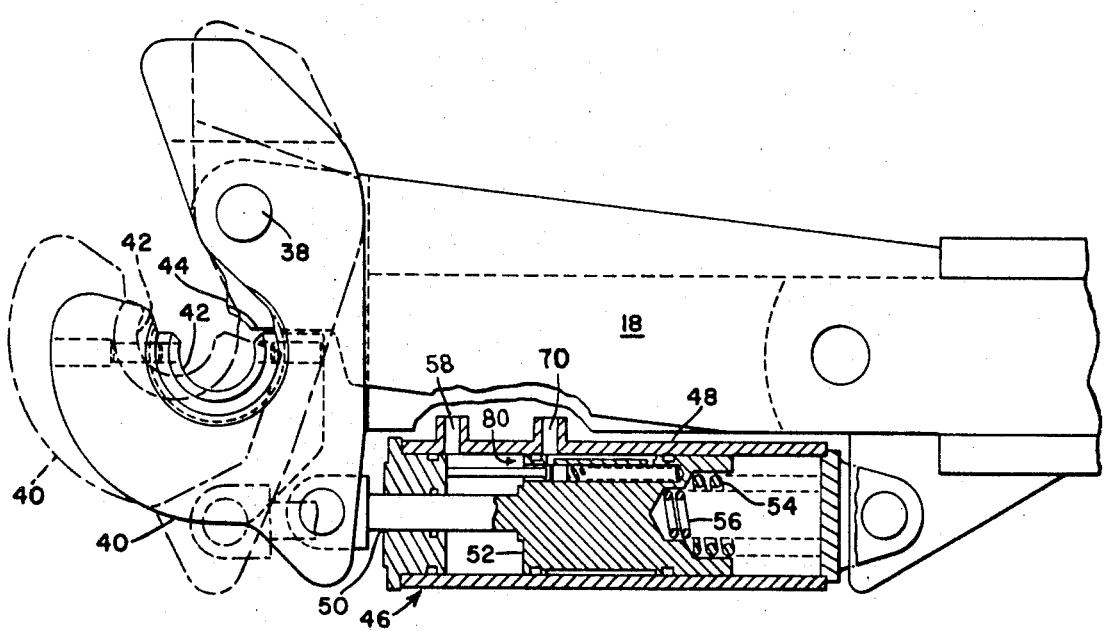
FIG. 2 is an enlarged right side view of one of the draft links shown in FIG. 1 and showing the draft hook operating and draft sensing actuator in longitudinal section.
Figure 3:
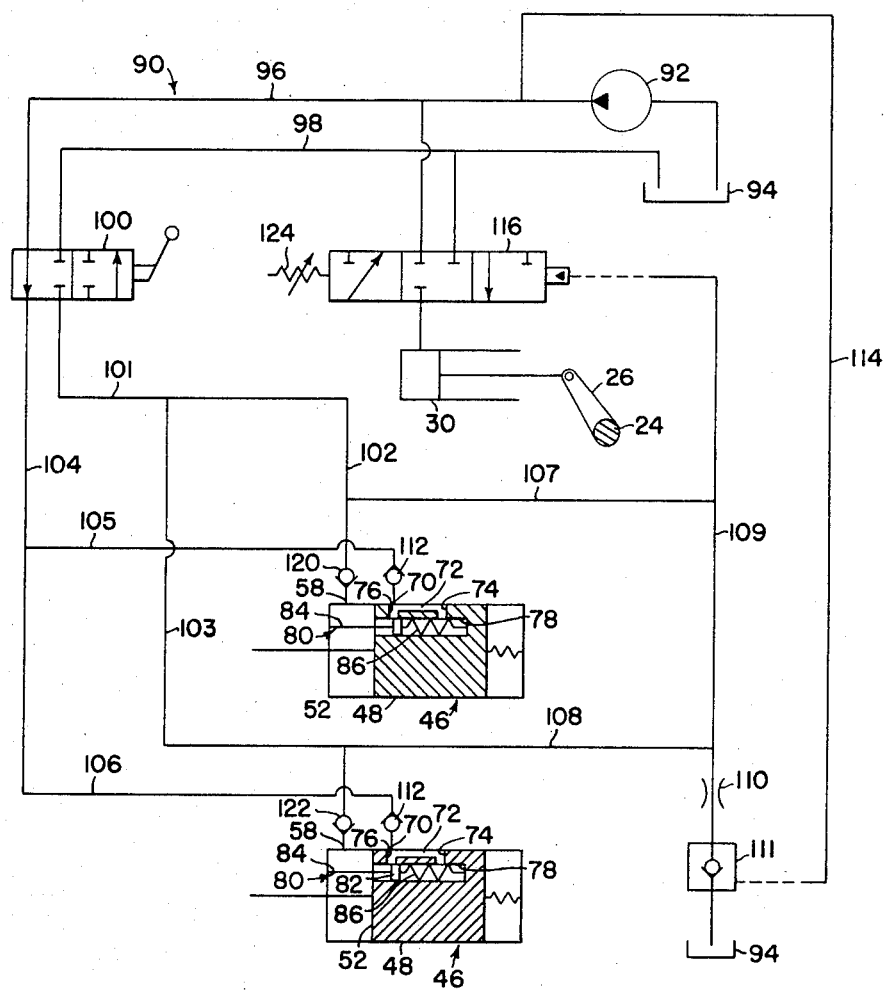
FIG. 3 is a schematic of the hydraulic system included in the tractor hitch system and showing the system used for controlling draft in response to the larger of the draft forces applied to the pair of draft hooks.

As viewed in FIG. 3, a pilot pressure port 58 leads into the forward end of each of the cylinders 48 and spaced axially to the right from each of the ports 58 is a work port 70. The work ports 70 are bridged by the pistons 52 and are in fluid communication with grooves 72 extending axially in the respective outer surfaces of the pistons 52. The forward and rearward ends of each of the grooves 72 are respectively connected by ports 74 and 76 to a valve bore 78 extending axially rearwardly in each of the pistons 52 from its rod end. Located in each of the valve bores 78 is an integral valve member 80 having a head 82 slidably received in an associated bore and having a stem 84 biased rearwardly into engagement with the end of the associated cylinder 48 by means of a spring 86 compressed between each of the heads 82 and the forward end of each of the bores 78. The length of the stems 84 is chosen such that the valve member heads 82 permit only a small amount of flow through the ports 76 when the actuators 46 are retracted, as shown in FIG. 2, for holding the draft hooks 40 in their implement part retaining position.

It is to be understood that instead of the pistons 52 being elongated as shown, the rearward ends of the cylinders 48 could be elongated with the valve bores 78 being located therein. The valve members 80 would then be located with their stems biased against the rearward faces of the pistons 52.

Referring now to FIG. 3, there is shown a hydraulic system 90 of the tractor 10 for controlling the draft forces imposed on the draft hooks 40 in response to the larger of the draft forces imposed on the hooks at any one time. The system 90 includes a pump 92 and a reservoir 94 connected respectively, via supply and exhaust lines 96 and 98, to a manual control valve 100. A return line 101 is connected to the valve 100 and has first and second branches 102 and 103 respectively connected to the pressure ports 58 of the upper and lower (FIG. 3) actuators 46. Similarly, a feed line 104 is connected to the valve 100 and has branches 105 and 106 respectively connected to the work ports of the upper and lower actuators 46. Third and fourth return fluid branches 107 and 108 respectively interconnect the return line branches 102 and 103 with a pilot line 109 which is connected to the reservoir 94 by a route bypassing the manual valve 100. Thus, when the valve 100 is in the position illustrated, the pump 92 supplies fluid pressure to the work ports 70 of the actuators 46. From the ports 70, fluid flows into the grooves 72 and out through the ports 76, past the valve member head 82 and into the cylinders 48 rearwardly of the pistons 52. Fluid exits from the cylinders 48, via the return ports 58, and returns to the reservoir 94 via the return branch lines 102 and 103 and the pilot line 109. The pressure in the cylinders 48 is maintained at a latching pressure slightly larger than that required for overcoming the force of the concentric springs 54 and 56 acting on each of the pistons 52 by means of a flow restrictor 110 located in the pilot line branch 109. Accordingly, when the valve 100 is positioned as shown, the pressure in the rearward ends of the cylinders 48 is normally sufficient to hold the pistons 52 retracted forwardly in the cylinders 48 for maintaining the draft hooks 40 in their latched condition illustrated in solid lines in FIG. 2. For the purpose of ensuring that the draft hooks 40 remain in their latched position in the event that the pump 92 should for some reason cease to operate or in the event that supply line 96 or the feed line 104 should fail, a pilot-operated check valve 111 is located in the pilot line 109 downstream from the restrictor 110 and a pair of non-return check valves 112 are respectively located in the feed line branches 105 and 106 adjacent the work ports 70. A pilot line 114 extends between the supply line 96 and the pilot-operated valve 111 and the pressure in the pilot line acts to hold the valve 111 open to permit flow to the reservoir 94 when the pump 92 is operating.

When earth-working implements are connected to the draft hooks 40, the soil resistance may at times cause forces on the implement which overcome the latching pressure on the hooks 40 in which case the hooks 40 will be caused to rotate rearwardly about the pins 38 and pull the pistons 52 rearwardly far enough to position the ports 76 in an increased unblocked relationship to the valve member heads 82 to permit additional fluid pressure to enter the cylinders 48. It is here noted that if forces act on the hooks 40 to rock the hooks forwardly about the pins 38 the pistons 52 will be moved forwardly and there will be an attendant decrease in the pressure in the cylinders 48 rearwardly of the pistons.

Thus, it is seen that the pressure existing in the cylinders 48, rearwardly of the pistons 52, is representative of the draft loads imposed on the draft hooks 40. This fact is used to advantage for controlling the draft on the hooks 40. Specifically, a pressure responsive control valve 116 is connected to the supply and exhaust lines 96 and 98 and to the draft link lift cylinder 30 and is shiftable among a neutral position wherein fluid is blocked to and from the cylinder 30 and first and second active positions respectively wherein the cylinder 30 is connected to the pump 92 and the reservoir 94. The pilot pressure for operating the valve 116 is that which exists in the cylinders 48 rearwardly of the pistons 52 and this pressure is conveyed to the valve 116 via the pilot line 109. One-way check valves 120 and 122 are respectively located in the return branch lines 102 and 103 between the ports 70 and the respective intersections with branch lines 107 and 108 and prevent fluid pressure from travelling from one cylinder 48 to the other thus making only the larger of the pressures existing in the cylinders effective for controlling the valve 116. The control valve 116 is biased against the pilot pressure by a variable spring 124 which is chosen so as to balance the forces on the valve to maintain it in its neutral position when desired draft loads are imposed on the draft hooks 40 and the pressure in the rearward ends of the cylinders 48 is the desired latching pressure. Thus, if the pressure in either one of the cylinders 48 increases above the preselected latching pressure, the valve 116 will be shifted against the spring 124 to its first active position to actuate the lift cylinder 30 to raise the draft links 18 and adjust the working depth of the implement upwardly to cause an attendant decrease in the draft loads on the hooks 40 and in the pressure in the cylinders. On the other hand, if the pressure in either of the cylinders 52 decreases below the preselected latching pressure, the spring 124 will shift the valve 116 to its second active position to connect the lift cylinder 30 to reservoir 94 thus permitting the draft links 18 to lower resulting in increased draft loads on the hooks 40 and increased pressure in the cylinders. It is here noted that the pressure operation of the valve 116 may be manually overriden so that the draft links 18 may be raised and lowered as desired by the operator.

Figure 4:
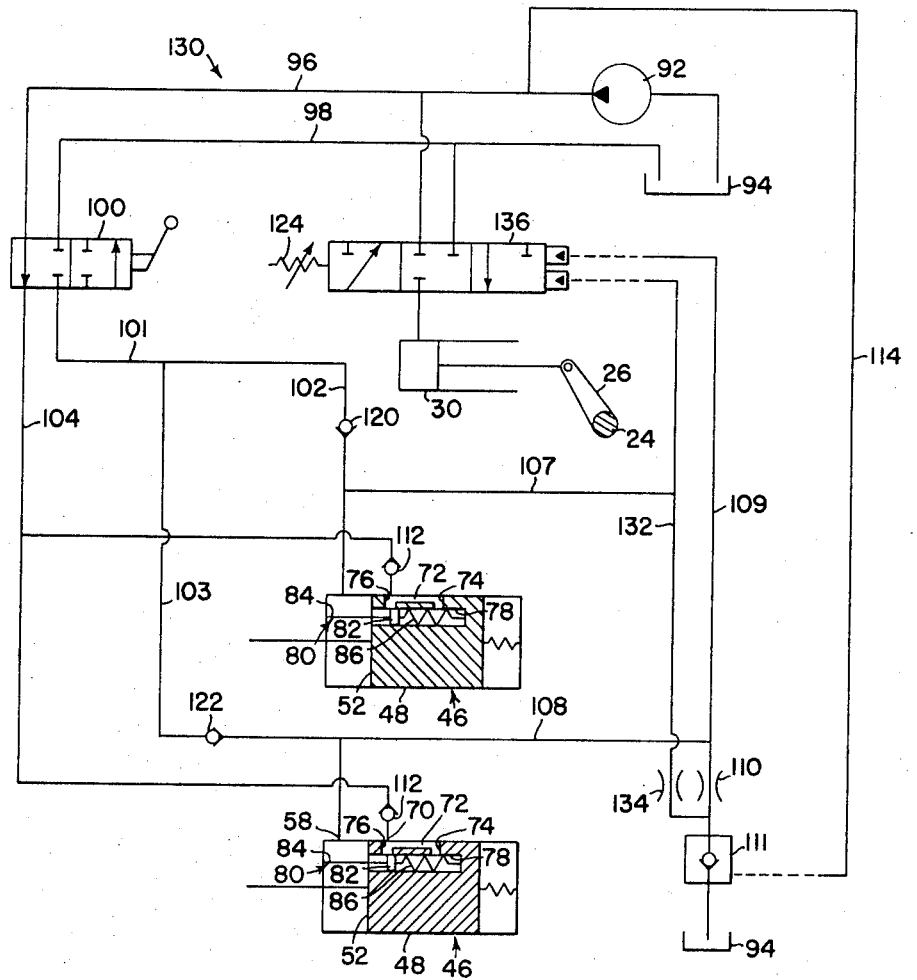
FIG. 4 is a view similar to FIG. 3 but showing a modified system used for controlling draft in response to the sum of the draft forces applied to the pair of draft hooks.

Referring now to FIG. 4, there is shown an alternate hydraulic system 130 for the tractor 10 for controlling the draft forces imposed on the draft hooks 40 in response to the sum of the draft forces imposed on the hooks at any one time. Portions of the system 130 are identical to portions of the system 90 and are given the same reference numerals applied to the system 90. One way the system 130 differs from the system 90 is that instead of being connected to the pilot line 109, the return line branch 107 is connected to a second pilot line 132, which contains a flow restrictor 134 and is connected to the pilot line 109 between the restrictor 110 and the pilot-operated valve 111. Another difference between the systems 90 and 130 is that in the system 130 the pressure responsive valve 116 is replaced by a pressure responsive valve 136 having a pair of concentric, equal areas (not shown) at its right end to which the pilot lines 109 and 132 are respectively connected. The variable spring 124 acts against the valve 136 in the same manner described above relative to the valve 116 but in this case the spring 124 must be set to overcome the sum of the latching pressures existing in the cylinders 48 rearwardly of the pistons 52. It is also noted that in the system 130 the check valves 120 and 122 are relocated in the return line branches 102 and 103 so as to respectively be between the manual control valve 100 and the intersections of the line 102 with the line 107, and of the line 103 with the line 108. The check valves 120 and 122 thus prevent the flow of pressure fluid between the branch lines 107 and 108.

The operation of the combined draft link latch and draft sensing mechanism embodying the hydraulic system 90 shown in FIG. 3 is as follows: The draft hooks 40 may be readied for receiving the hitch pins or other connecting parts of an implement by relieving the pressure in the rearward ends of the cylinders 48 by positioning the manual valve 100 so as to connect the cylinder work ports 70 to the reservoir 94. With the relieving of the pressure, the concentric springs 54 and 56 force the pistons 52 and, consequently the rods 50, rearwardly to cause the hooks 40 to be rocked rearwardly and disposed in their unlatched or implement part-receiving position shown in dashed lines in FIG. 2. The operator then appropriately moves the tractor and operates the lift cylinder 30 to dispose the implement hitch parts in the receptacle portions 42 of the hooks. To capture or latch the hitch parts in the receptacle portions 42, the operator shifts the control valve 100 to connect the pump 92 to the ports 70. Fluid pressure is thus introduced into the cylinders 48 via a fluid passage comprising the ports 70, the grooves 72, the ports 76 and the bores 78, it being noted that the valve member heads 82 occupy respective positions forwardly of the ports 76. Fluid pressure exits from the cylinders 48 via the return ports 58 and from there flows to the reservoir 94 via the return line branches 102 and 103 and the pilot line 109, it being noted that the pilot-operated check valve 111 is held open since the pump 92 is operating. The flow restrictor 110 is sized to cause the pressure in the lines 107–109 and 101–103 to build until the pressure in the cylinders 48 is slightly larger than that required to overcome the force exerted on the pistons 52 by the springs 54 and 56. The pressure in the cylinders 48 then forces the pistons 52, and hence the rods 50, forwardly until the valve member heads 82 permit only a small flow through the ports 76. At this point, the hooks 40 occupy their implement part-retaining position, shown in solid lines in FIG. 2, wherein the fixed receptacle portions or latch surfaces 44 respectively overlie and capture the implement parts in the movable receptacle portions 42. The tractor and implement combination is then ready for field operation.

If the pump 92 should for any reason cease to operate or should any of the fluid lines fail, the latching pressure will be trapped in the rearward ends of the cylinders 48 through the cooperative action of the check valves 112, which prevent the reversal of fluid flow through the work ports 70 of the actuators 46, and of the check valve 111 which closes to prevent return fluid from flowing from the return ports 58 of the actuators 46 to the reservoir 94.

If the implement is a fully- or semi-mounted earth-working implement, the operator may lower the implement into earth-working position by manually overriding the pressure responsive lift cylinder control valve 116 and shifting the latter rightwardly (FIG. 3) to connect the lift cylinder 30 to the reservoir 94 thus permitting the draft links 18 to lower. The valve 116 is then returned to its neutral position wherein the spring 124 balances the force exerted on the right end of the valve 116 by the hook latching pressure contained in pilot line 109. If the earth-working implement should encounter soil conditions, or the like, which cause the loads on the draft hooks 40 to increase to the extent that the hooks pivot rearwardly, the ports 76 will be pulled further rearwardly past the valve heads 82 and additional fluid pressure will be introduced into the cylinder 48 to return the hooks 40 to their part-retaining position. The increase in pressure in the cylinders 48 is transferred, via the return lines 102 and 103, the branch lines 107 and 108 and the pilot line 109, to the valve 116 which is shifted leftwardly against the bias of the spring 124, to its first active position connecting the pump 92 to the draft link lift cylinder 30 to cause the latter to power lift the draft links 18 and adjust the operating depth of the implement upwardly to reduce the draft forces and, hence, reduce the pressure in the cylinders 48 until the latching pressure is restored at which time the spring 124 will return the valve 116 to its neutral position. Similarly, if loads on the hooks 40 should cause the pressure in the cylinders 52 to drop below the latching pressure, the valve 116 will be shifted rightwardly in response to this drop in pressure to its second active position connecting the lift cylinder 30 to the reservoir 94 resulting in the lowering of the draft links 18 and an attendant increase in the working depth of the implement to the point where the draft forces acting on the hooks 40 restore the pressure in the cylinders 48 to the latching pressure at which time the valve 116 is again returned to its balanced neutral position.

The above discussion assumes that both draft hooks 40 will have equal draft loads imposed thereon. In actual operation, this may not be the case and the check valves 120 and 122 prevent the pressure fluctuations in one of the cylinders 48 from influencing the pressure in the other of the cylinders 48 and results in the pressure responsive valve 116 being controlled by the larger of the pressures existing in the cylinders 48.

The operation of the combined draft link latch and draft sensing means embodying the hydraulic system shown in FIG. 4 is essentially the same as that embodying the system 90 except that the pressure responsive control valve 136 is responsive to the sum of the draft forces imposed on the draft hooks 40. Thus, assuming the pump 92 to be operative in the system 130, the pilot lines 109 and 132 respectively carry the fluid returning from the lower and upper actuators 46 (FIG. 4) and the pressure in these lines is respectively connected to the separate equal areas at the right end of the pressure responsive valve 136. Thus, the sum of the pressures acting on pistons 52 acts against the right end of the valve 136. The flow restrictors 110 and 134 respectively maintain latching pressures in the pilot lines 109 and 132 at values slightly higher than that necessary for holding the lower and upper actuators 46 in their retracted positions for keeping the hooks 40 latched. The spring 124 is adjusted to balance the sum of these latching pressures and maintains the valve 136 in its neutral position when the desired draft loads are imposed on the hooks 40.

Should it be desired to disconnect the implement from the hitch 14, the operator merely shifts the valve 100 to connect the return ports 58 to the reservoir 94. This causes the pressure rearwardly of the cylinders 52 to be exhausted allowing the concentric springs 54 and 56 to move the pistons 52 and hence the rods 50 rearwardly to rock the hooks 40 to their implement part-receiving positions. The hitch 14 can then be manipulated to become disengaged from the implement.

Thus, it can be seen that a simple effective means is provided for accomplishing powered hookup of implements and for accomplishing draft control in the case of semi- or fully-mounted earth-working implements.

I claim:

1. A tractor hitch comprising: a vertically swingable draft member means including latching surface means projecting therefrom; draft hook means vertically pivotally connected to said draft member means in the vicinity of said latching surface means and including generally upwardly opening receptacle means, said hook means being swingable between an implement part receiving position wherein said receptacle means is spaced away from said surface means and an implement part retaining position wherein said receptacle means is beneath said surface means; and power means including motor means connected between said draft member means and said hook means for swinging the hook means between said receiving and retaining positions; and said motor means including draft load sensing means for sensing and generating a signal representative of draft forces imposed on said draft hook means by an implement attached thereto; second motor means being connected to said draft member means for raising and lowering the latter; motor control means connected to said second motor means and being responsive to draft signals representative of draft loads above and below a preselected draft load for respectively actuating said second motor means from a neutral condition holding said draft member means in place to first and second active conditions for respectively raising and lowering said draft member means for adjusting the vertical height of an implement connected to said draft hook means for causing an attendant decrease and increase in the draft loads imposed on said draft hook means to restore said preselected draft load thereon; and signal transferring means interconnecting said draft load sensing means and said motor control means.

2. The invention defined in claim 1 wherein said receptacle means is generally semi-circular as viewed in the direction of the pivot axis of said hook means and said surface means forming a continuation of said receptacle means when the hook means is in said retaining position.

3. The invention defined in claim 1 wherein said draft member means includes a pair of draft links and wherein said motor means includes a pair of motors respectively carried by said pair of draft links; said draft load sensing means including a pair of draft load sensing means respectively embodied in said pair of motor means; and said signal transferring means including means for transferring only the largest of the signals generated at any one time respectively by the pair of draft load sensing means.

4. The invention defined in claim 1 wherein said draft member means includes a pair of draft links and wherein said motor means includes a pair of motors respectively carried by said pair of draft links; said draft load sensing means including a pair of draft load sensing means respectively embodied in said pair of motor means; and said signal transferring means including means for transferring the sum of the signals generated at any one time respectively by the pair of draft load sensing means.

5. The invention defined in claim 1 wherein said motor means comprises extensible and retractable hydraulic actuator means including cylinder means having head end means pivotally connected to said draft member means and containing integral piston means and rod means, the rod means projecting from said cylinder means and being pivotally connected to said hook means; biasing means urging said hook means toward said receiving position; said power means further including pressure fluid source means and sump means connected to control valve means, feed line means and return line means connecting control valve means to said cylinder means and said control valve means being selectively operable for connecting said source means to said cylinder means for shifting said rod and piston means in a direction opposing said biasing means for moving said hook means to said retaining position, and for connecting said sump means to said cylinder means for exhausting the latter and permitting said biasing means to move said hook means to said receiving position; a second hydraulic actuator means connected to said draft member means for raising and lowering the latter; pressure responsive control valve means connected to said source means, said sump means and said second actuator means and being responsive to pressures above and below a preselected pressure for respectively actuating said second actuator means from a neutral condition holding said draft member means in place to first and second active conditions for respectively raising and lowering said draft member means for adjusting the vertical height of an implement connected to said draft hook means for causing an attendant decrease and increase in the draft loads imposed on said draft hook means; and said cylinder means being connected to said pressure responsive control valve means; and said predetermined pressure being at least as large as that required to move said draft hook means against said biasing means to said retaining position.

6. The invention defined in claim 5 wherein said biasing means comprises coil spring means compressed between the head end means of said cylinder means and said piston means.

7. The invention defined in claim 5 wherein said return line means includes a return branch line means, exclusive of said control valve means, connecting said cylinder to said sump; said return branch line means containing flow restrictor means for maintaining the pressure in said cylinder at a value sufficient for maintaining said rod and piston means in a position holding said hook means in said retaining position.

8. The invention defined in claim 7 wherein said return branch line means contains a pilot-operated check valve means normally being in a closed position blocking flow to the sump and being connected to said source means and responsive to the pressure of the fluid delivered by the source means for shifting to an open position connecting the return branch line means to the sump; and one-way check valve means being located in said feed line means for preventing the reversal of flow therein in a direction from the cylinder means toward the control valve means, whereby fluid pressure in the cylinder means will be maintained in the event of feed line failure or in the event that the source means ceases to operate.

9. The invention defined in claim 7 wherein said hydraulic actuator means further includes position responsive valve means for increasingly restricting the flow of pressure fluid to the cylinder means, as the piston and rod means moves from a first position, for holding the draft hook means in its receiving position, to a second position for holding the draft hook means in its retaining position.

10. The invention defined in claim 7 wherein said piston means bridges the location of the connection of said valve means with said cylinder means; valve bore means extending axially in said piston means and having open end means oriented in the direction of action of said biasing means, passage means in said piston means including port means fluid-connecting the bore means with the connection of said valve means with said bore means; and position responsive valve means shiftably mounted in said bore means for controlling the flow of fluid from said port means to said open end means by increasingly restricting said port means in response to the piston means moving from a first position, wherein the hook means is in its receiving position, to a second position, wherein the hook means is in its retaining position.

11. For a tractor having a vertically swingable draft linkage, power lift means for selectively adjusting the vertical disposition of said linkage and a control means for controlling actuation of said power lift means in response to signals representative of draft forces exerted on said linkage so as to raise and lower said linkage respectively when the draft forces are greater and lesser than a preselected draft force, a novel hitch apparatus comprising: a hook means pivotally mounted on said draft linkage for swinging between an implement part receiving position and an implement part retaining position wherein draft loads imposed by the implement on said hook means tend to pivot the latter to the receiving position; a combined actuating and draft force sensing means carried by said linkage and connected to said hook means for moving the latter between said part receiving and retaining positions and for sensing draft forces imposed on said hook means and generating signals representative of the draft forces; and signal transferring means connected between said actuating and draft sensing means and said control means for causing the latter to actuate said power lift means in response to signals representative of draft forces above and below a preselected force, to adjust the vertical disposition of the linkage to restore said preselected draft force thereon.

12. The invention defined in claim 11 wherein said actuating and draft sensing means comprises cylinder means having head end means pivotally connected to said draft linkage means and containing integral piston means and rod means, the rod means projecting from said cylinder means and being pivotally connected to said hook means; biasing means urging said hook means toward said receiving position; said power lift means including a hydraulic motor; a source of fluid pressure and a reservoir; said control means being a pressure responsive valve connected between said hydraulic motor and said source and reservoir and responsive to pressure above and below a preselected pressure for respectively actuating said motor from a neutral condition holding said draft linkage means fixed to first and second conditions for respectively raising and lowering said linkage means for adjusting the vertical height of an implement connected to the hook means for causing an attendant decrease and increase in the draft loads imposed on said hook means; and said cylinder means being connected to said pressure responsive valve means; and said predetermined pressure being at least as large as that required to move said draft hook means against said biasing means to said retaining position.

13. A tractor hitch comprising: a vertically swingable draft member means, draft receptacle means including at least one part means movably connected to said draft member means for movement generally in the direction of draft between a rearward position wherein an implement part can be received in said receptacle means and a forward position wherein an implement part received in said receptacle will be retained in the latter and will be in bearing engagement with said one part means; power means including motor means connected between said member means and said one part means for moving the one part means between said rearward and forward positions; said motor means including draft load sensing means for sensing and generating a signal representative of draft forces imposed on said one part means by an implement having a part retained in said receptacle means; second motor means being connected to said draft member means for raising and lowering the latter; motor control means connected to said second motor means and being responsive to draft signals representative of draft loads above and below a preselected draft load for respectively actuating said second motor means from a neutral condition, holding said draft member means in place, to first and second active conditions for respectively raising and lowering said draft member means for adjusting the vertical height of an implement connected to said draft hook means for causing an attendant decrease and increase in the draft loads imposed on said one part means to restore said preselected draft load thereon; and signal transferring means interconnecting said load sensing means and said motor control means.

14. The invention defined in claim 13 wherein said motor means comprises extensible and retractable hydraulic actuator means.

15. The invention defined in claim 14 wherein said hydraulic actuator means includes cylinder means having head end means pivotally connected to said draft member means and containing integral piston means and rod means; the rod means projecting from said cylinder means and being pivotally connected to said one part means of said receptacle means; biasing means urging said one part means toward said rearward position; and power means further including pressure fluid source means and sump means connected to control valve means, said valve means being in turn connected to said cylinder means and being selectively operable for connecting said source means to said cylinder means for shifting said rod and piston means in a direction opposing said biasing means for moving said one part means to said forward position, and for connecting said sump means to said cylinder means for exhausting the latter and permitting said biasing means to move said one part means to said rearward position.

16. The invention defined in claim 15 and further including a second hydraulic actuator means connected to said draft member means for raising and lowering the latter; pressure responsive control valve means connected to said source means, said sump means and said second actuator means and being responsive to pressure above and below a preselected pressure for respectively actuating said second actuator means from a neutral condition holding said draft member means in place to first and second active conditions for respectively raising and lowering said draft member means for adjusting the vertical height of an implement having a part retained in said receptacle means for causing an attendant decrease and increase in the draft loads imposed on said one part means; and said cylinder means being connected to said pressure responsive control valve means; and said predetermined pressure being at least as large as that required to move said one part means against said biasing means to said forward position.

17. The invention defined in claim 15 wherein said hydraulic actuator means further includes position responsive valve means for increasingly restricting the passage of fluid to the rod end means of said cylinder means in response to said piston means moving from a first position, wherein the one part means is in its rearward position, to a second position wherein the one part means is in its forward position.

18. The invention defined in claim 15 wherein said piston means bridges the location of the connection of said valve means with said cylinder means; valve bore means extending axially in said piston means and having open end means oriented in the direction of action of said biasing means, passage means in said piston means including port means fluid-connecting the bore means with the connection of said valve means with said bore means; and position responsive valve means shiftably mounted in said bore means for controlling the flow of fluid from said port means to said open end means by blocking said port means in response to the piston means reaching a preselected axial position in said cylinder means.

19. The invention defined in claim 18 wherein said position responsive valve means comprises valve spool means having land means slidably received in said bore means and stem means projecting through said open end means of said bore means and means biasing said spool means towards a position wherein said stem means is engaged with an end means of said cylinder means.

* * * * *